US012440784B2

(12) United States Patent
Mustakangas et al.

(10) Patent No.: US 12,440,784 B2
(45) Date of Patent: Oct. 14, 2025

(54) FILTER PLATE SUBFRAME

(71) Applicant: Metso Outotec Finland Oy, Tampere (FI)

(72) Inventors: Mirva Mustakangas, Pirkkala (FI); Ismo Juvonen, Rauha (FI); Janne Kaipainen, Halsua (FI); Teemu Eloranta, Luumaki (FI); Mika Illi, Vantaa (FI); Kari Vanttinen, Espoo (FI)

(73) Assignee: Metso Finland Oy, Espoo (FI)

( * ) Notice: Subject to any disclaimer, the term of this patent is extended or adjusted under 35 U.S.C. 154(b) by 378 days.

(21) Appl. No.: 18/251,327

(22) PCT Filed: Nov. 6, 2020

(86) PCT No.: PCT/FI2020/050737
§ 371 (c)(1),
(2) Date: May 1, 2023

(87) PCT Pub. No.: WO2022/096771
PCT Pub. Date: May 12, 2022

(65) Prior Publication Data
US 2024/0009597 A1    Jan. 11, 2024

(51) Int. Cl.
*B01D 25/21* (2006.01)
(52) U.S. Cl.
CPC ...... *B01D 25/215* (2013.01); *B01D 2201/342* (2013.01)
(58) Field of Classification Search
CPC ............ B01D 25/215; B01D 2201/342; B01D 25/21; B01D 25/12

USPC ........................................................ 210/231
See application file for complete search history.

(56) References Cited

U.S. PATENT DOCUMENTS

| 4,749,482 A | 6/1988 | Bonn |
| 2002/0100264 A1 | 8/2002 | Rivera et al. |

FOREIGN PATENT DOCUMENTS

| CN | 103041639 A | 4/2013 |
| CN | 205435265 U | 8/2016 |
| CN | 208365792 U | 1/2019 |
| CN | 211676474 U | 10/2020 |

(Continued)

OTHER PUBLICATIONS

International Search Report and Written Opinion for International Application No. PCT/FI2020/050737, mailed Feb. 8, 2021.

(Continued)

*Primary Examiner* — Ekandra S. Miller-Cruz
(74) *Attorney, Agent, or Firm* — Andrus Intellectual Property Law, LLP

(57) ABSTRACT

A filter plate subframe for a filter plate frame assembly having a filter plate frame and a filter plate subframe slidably receivable therein. The subframe comprises separate periphery segments attached to each other so as to form a continuous, generally rectangular periphery region with flank sides and end sides. The flank sides have a linear density lower than that of the end sides, and the end sides have a bending stiffness higher than that of the end flank, while either or both of the first end side and the second end side are provided with a reinforcement bar for increasing the bending stiffness said end sides. A supporting surface is provided on a first planar side of periphery segments forming the flank sides the supporting surface.

14 Claims, 2 Drawing Sheets

(56) References Cited

FOREIGN PATENT DOCUMENTS

| | | |
|---|---|---|
| GB | 2035119 A | 6/1980 |
| JP | S51104469 U | 8/1976 |
| JP | S5573305 A | 6/1980 |
| JP | H10230107 A | 9/1998 |
| JP | 2005144393 A | 6/2005 |
| JP | 2011156459 A | 8/2011 |

OTHER PUBLICATIONS

Search Report for ARIPO Patent Application No. AP/P/2023/014917, dated Aug. 27, 2024.
Office Action for Chinese Patent Application No. 202111248219.X, issued Dec. 31, 2024.
Decision of Grant for Japanese Patent Application No. 2023-524714, dated Apr. 15, 2025.

FILTER PLATE SUBFRAME

CROSS-REFERENCE TO RELATED APPLICATIONS

This application is the U.S. national stage application of International Application PCT/FI2020/050737, filed Nov. 6, 2020, which international application was published May 12, 2022, as International Publication WO 2022/096771 A1 in the English language.

FIELD OF THE DISCLOSURE

The present disclosure relates to a vertical filter press, such as tower press, having a filter plate frame for supporting a filter plate and a filter plate subframe receivable within the filter plate frame. More particularly, the present disclosure concerns such a filter plate subframe.

BACKGROUND OF THE DISCLOSURE

In conventional vertical filter presses, filter chambers are formed between adjacent superimposed filter plates. Typically, the filter plates are supported on the apparatus by filter plate frames, which also laterally delimit the filter chamber between the adjacent filter plates. That is, the filter plate frame must be arranged sufficiently rigid to both support the associated filter plate and to withstand the pressure differential exerted thereon during operation without excessive deformation. As a result, such filter frames are relatively heavy and bulky, which hinders replacement of associated wearing parts, such as seals and diaphragms, as the whole filter plate frame must be removed from the filter apparatus in order to carry out such replacements safely.

Recently, it has been discovered, that the filter plate frame may be provided with a separate removable subframe, having many of the wearable components attached thereon. As the filter plate frame still provides support and rigidity, the subframe is enabled to be provided with a relatively much more light-weight structure, thereby facilitating removal thereof and replacement of wearing components.

BRIEF DESCRIPTION OF THE DISCLOSURE

An object of the present disclosure is to provide a filter plate subframe further facilitating the replacement of wearable components associated thereto.

The object of the disclosure is achieved by the filter plate subframe which is characterized by what is stated in the independent claim. The preferred embodiments of the disclosure are disclosed in the dependent claims.

The disclosure is based on the idea of providing a substantially rectangular subframe having end sides with a structure providing a bending stiffness higher than that of the flank sides, while the flank sides are provided with a structure having a linear density less than that of the end sides. To this end, either or both of the end sides are provided with a reinforcement bar. Moreover, the subframe is longitudinally slidably receivable within an associated filter plate frame along a support surface on a first planar side of the flank sides, so as to be supported thereat within the frame.

An advantage of the subframe according to the present disclosure is that the rigidity of the subframe in a direction transverse to the longitudinal is increased, while the overall weight of the subframe is decreased. This facilitates replacement of wearable components associated to the subframe, because the lighter overall weight makes manipulation of the subframe easier in general. Furthermore, the increased rigidity in the transverse direction reduces the transverse cross section deformation of the subframe when supported by the flank sides, thereby making it easier to withdraw and insert the subframe into the frame.

According to a first aspect of the present disclosure, a filter plate subframe is provided for a filter plate frame assembly. Such a filter plate frame assembly has a filter plate frame and a filter plate subframe receivable therein.

The filter plate subframe comprises separate periphery segments attached to each other so as to form a continuous periphery region of the subframe. The periphery region surrounds and delimits an open region of the subframe. The open region of the subframe laterally delimits a filter chamber, when in use.

The periphery region is of a generally rectangular shape having a first flank side and an opposite second flank side parallel with the first flank side. The flank sides run along a longitudinal direction of the subframe. The periphery region also has a first end side and an opposite second end side parallel with the first end side, the end sides being transverse to the flank sides.

Particularly, the flank sides have a linear density lower than that of the end sides, and the end sides have a bending stiffness higher than that of the end sides. Moreover, either or both of the first end side and the second end side are provided with a reinforcement bar for increasing the bending stiffness said end sides. Most suitably, the reinforcement bar is separate from the periphery segments, but releasably fixed thereto.

Furthermore, the subframe is configured to be slidably receivable within a filter plate frame along the longitudinal direction of the subframe. A supporting surface is provided on a first planar side of periphery segments forming the flank sides. The supporting surface is configured to support the filter plate subframe on a corresponding receiving surface of an associated filter plate frame, along which the subframe is slid into the frame.

In an embodiment of the first aspect according to the present disclosure, the supporting surfaces are arranged to have a dry kinetic friction coefficient with steel of no more than 0.3, as determined in accordance with ASTM D1894. This can be achieved by choosing a suitable material and/or surface roughness for the supporting surfaces In a further embodiment of the first aspect according to the present disclosure, the reinforcement bar extends up to, or over, corners between an end side and flank sides adjacent to the end side associated to the reinforcement bar. That is, the reinforcement bar extended over the whole width (i.e. in the direction transverse to the longitudinal) of the subframe 1, thereby ensuring that reinforcement bar extends over a receiving surface of an associated filter frame, when in use.

In a further embodiment according to the first aspect of the present disclosure, the reinforcement bar is of a different material than the periphery segments, having an elastic modulus higher than that of the periphery segments.

For example, this could be achieved by providing the reinforcement bar from steel or a composite material, such as an FRP, and by providing the periphery segments from a plastics material.

In a further embodiment according to the first aspect of the present disclosure, each corner between adjacent end sides and flank sides is provided with an identical corner periphery segment.

In a further embodiment according to the first aspect of the present disclosure, at least one of the periphery segments is a feed segment comprising one or more feed openings for feeding slurry to be filtered into the open region, when in use, such that the feed segment is removably attached to adjacent periphery segments.

This ensures that the feed segment, which is susceptible to wear caused by the abrasive slurry flow through the feed openings, is replaceable separately without having to replace the whole subframe.

Preferably, but not necessarily, the feed segment is removable from adjacent periphery segments in a direction away from the open region. This further facilitates replacement of the feed segment, as it does not need to be detached inwards towards the open region.

Preferably, but not necessarily, the feed segment is provided at either or both of the first flank side and the second flank side. This is a particularly advantageous position for the feed segment, as the flank sides are supported by the filter plate frame along their length. This, in turn, is important, as the feed segments are not structurally as strong as periphery segments without feed openings.

Preferably, but not necessarily, identical feed segments are provided at both the first flank side and the second flank side.

In a further embodiment according to the first aspect of the present disclosure, a diaphragm groove is provided on the second side of the periphery region, opposite to the first planar side, for receiving and attaching with a corresponding bead of a filter diaphragm. The diaphragm groove runs along the periphery region and is formed on separate periphery segments attached to each other so as to form a continuous annular groove.

For example, the diaphragm groove may have a cross-sectional profile having an aperture portion, which opens towards the second planar side of the filter plate subframe, a bottom portion and a neck portion between the aperture portion and the bottom portion. Moreover, the laterally extending dimension of the bottom portion may exceed that of the neck portion. That is, in the cross-sectional profile of the diaphragm groove, a narrowed waist is formed by the neck portion, with respect to the bottom portion 5a. This enables an associated bead of a filter diaphragm having a corresponding cross-sectional profile to be form-fittingly attached to the diaphragm groove.

Furthermore, the laterally extending dimension of the bottom portion 5a may be defined as a maximum laterally extending dimension (i.e. width) thereof, whereas the laterally extending dimension of the neck portion may be defined as a minimum laterally extending dimension (i.e. width) thereof. The groove may then suitably have an asymmetric cross-sectional profile with respect to a vertical asymmetry axis running through a lateral centre point of a minimum width section of the neck portion. The vertical asymmetry axis is perpendicular to a general plane of the subframe, which is defined by a planarity of the open region. The minimum width section of the neck portion may be defined as a point of the cross-sectional profile of the groove at which the neck portion exhibits a smallest laterally extending dimension. That is, the minimum width section is defined at the most narrow point of the neck portion, i.e., at a point having the smallest dimension of the neck portion along a horizontal direction, transverse to the running direction of the groove and parallel with the general plane of the frame 4.

Moreover, the bottom portion suitably extends laterally further from the asymmetry axis on a lateral outside (facing away from the open region) than on the lateral inside (facing towards the open region).

The above described arrangement ensures that, when inserted into the diaphragm groove, a corresponding bead of an associated diaphragm is able to better resist torsion caused by the weight of the diaphragm itself.

In a further embodiment according to the first aspect of the present disclosure, a sealing strip groove is provided on the first planar side of the periphery region, for receiving and attaching with a corresponding sealing strip intended to seal against a filter plate below the subframe, when in use. The sealing strip groove runs along the periphery region and is formed on separate periphery segments attached to each other so as to form a continuous annular groove.

Preferably, but not necessarily, the sealing strip groove has a cross-sectional profile comprising a bottom portion and a neck portion opening between the bottom portion and the first planar side of the subframe. Moreover, the neck portion may have a cross-sectional width less than that of the bottom portion. That is, in the cross-sectional profile of the subframe, the neck portion of the sealing strip groove is narrower than the bottom portion of the sealing strip groove, as seen along the direction in which the groove extends at a given point.

Furthermore, the cross-sectional profile of the sealing strip groove may be asymmetric with respect to a vertical line extending perpendicularly to the first planar side through a lateral centre point of bottom portion of the sealing strip groove, thus defining a chamber side (on the side of the open region) and a an outer side.

Preferably, but not necessarily, the chamber side of the bottom portion of the sealing strip groove may exhibit a larger curvature than the outer side of the bottom portion of the sealing strip groove.

Preferably, but not necessarily, in the cross-sectional profile of the filter subframe, on the chamber side, the curvature of the bottom portion of the sealing strip groove curvature extends up to the neck portion continuously. For example, the curvature of said bottom portion may transform into the neck portion as a continuous curvature.

Preferably, but not necessarily, in the cross-sectional profile of the subframe, on the outer side, the bottom portion of the sealing strip groove exhibits a linear contour extending up to the neck portion of the sealing strip groove.

In a further embodiment according to the first aspect of the present disclosure, a segment seal is provided in a joint between adjacent periphery segments. Most suitably, such a segment seal is provided in each joint between adjacent periphery segments.

Preferably, but not necessarily, such a segment seal is provided at a portion of the joint coinciding with the diaphragm groove and the sealing strip groove, as discussed above, the segment seal being provided as a cylindrical peg extending between a bottom of the diaphragm groove and a bottom of the sealing strip groove.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
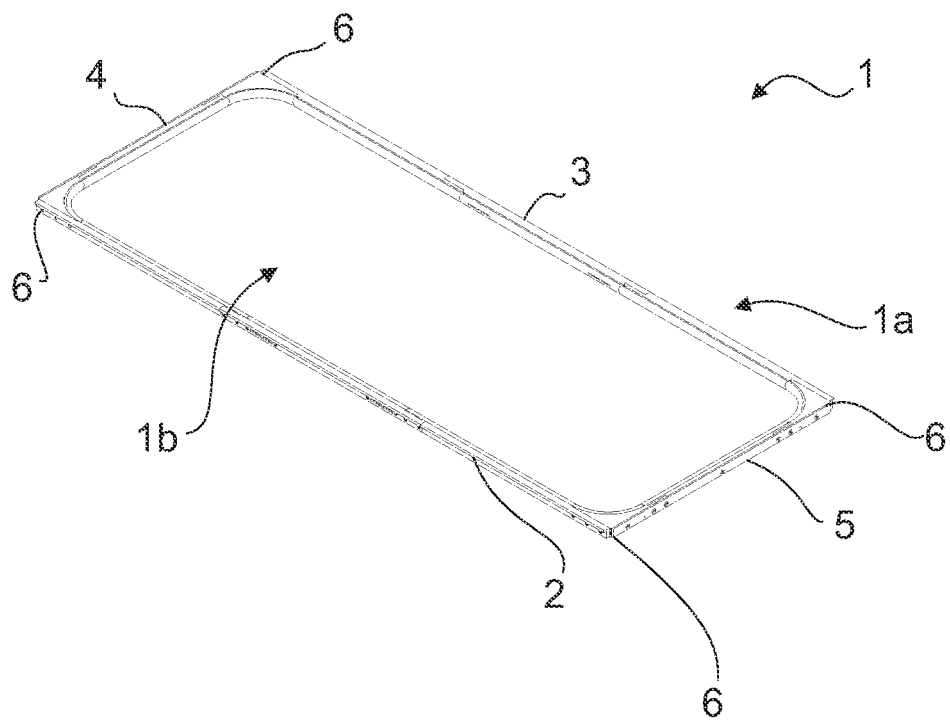
FIG. 1 illustrates a schematic representation of a filter plate subframe according to an embodiment of the present disclosure, as seen as a perspective view.

FIG. 1 shows a perspective view of a filter plate subframe 1 according to an embodiment of the present disclosure. The subframe 1 has a periphery region la of a substantially rectangular shape having a first flank side 2 and an opposing second flank side 3, which extend along the longitudinal direction of the subframe 1 and are parallel with each other. The periphery region 1a also comprises a first end side 4 and an opposing second end side 5, which are parallel with each other and transverse with respect to the flank sides 2, 3. Corners 6 connect adjacent flank sides 2, 3 and end sides 4, 5 to each other. Particularly, the periphery region la defines an delimits and open region 1b within.

Figure 2:
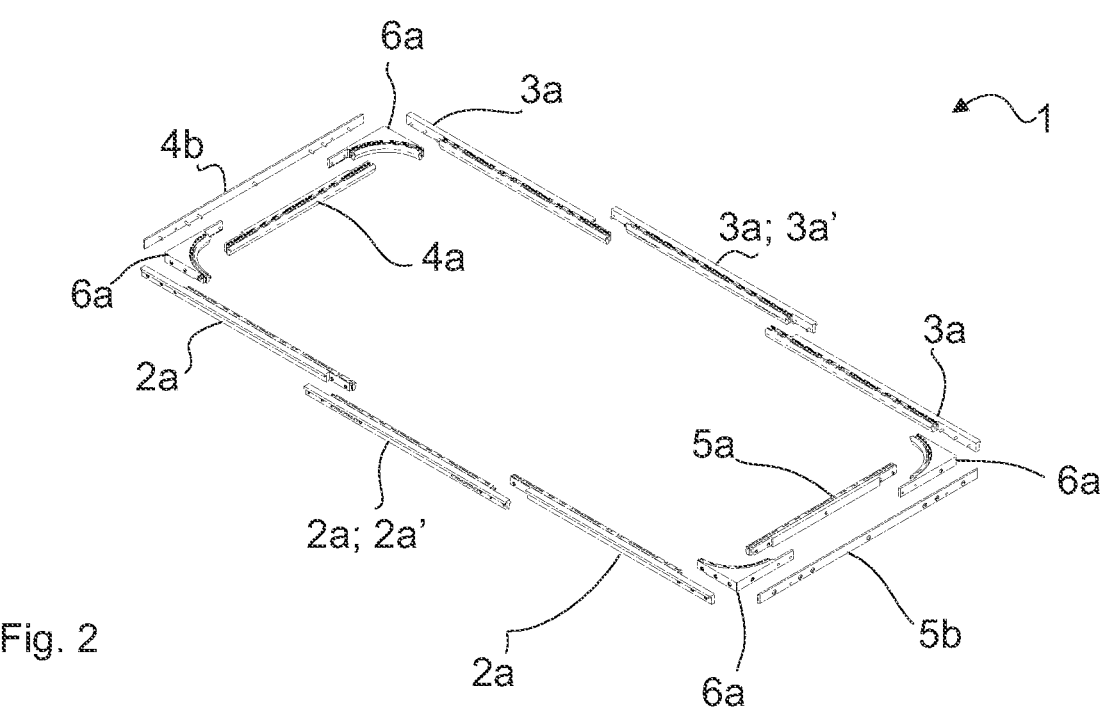
FIG. 2 illustrates the filter plate subframe of FIG. 1 as seen as an exploded perspective view.

FIG. 2 shows more clearly how the periphery region la comprises a plurality of periphery segments, which form the periphery of the subframe 1. Particularly, the first flank side 2 comprises separate periphery segments 2a attached to each other, one of which is a feed segment 2a'. Similarly, the second flank side 3 comprises separate periphery segments removably attached to each other, one of which is a feed segment 3a'. Although not illustrates, the feed segments 2a', 3a' one or more feed openings for feeding slurry to be filtered into the open region, when in use. Particularly, the feed segments 2a', 3a' are removable from adjacent periphery segments 2a, 3a in a direction away from the open region. Also, although not clearly visible from the appended drawings, the feed segments 2a', 3a' are identical with each other.

The first end side 4 comprises a single periphery segment 4a, although the first end side 4 may alternatively be formed of multiple periphery segments. Correspondingly, the second end side 5 also comprises a single periphery segment 5a, although the first end side 5 may alternatively be formed of multiple periphery segments.

In the embodiment of the illustrated drawings, the flank sides 2, 3 and the end sides 4, 5 are connected to each other by corners 6. Particularly, the corners 6 comprise corner segments 6 which are removably attached to adjacent periphery segments 2a, 3a, 4a, 5a. It should be noted that the flank side 2, 3 and end sides 4, 5 may alternatively be configured so as to be coupled directly to each other, without a separate corner. In the embodiment of the appended drawings, the corner segments 6a are identical with each other.

Both the first end side 4 and the second side end 5 are equipped with a reinforcement bar 4b, 5b removably attached to and extending over the periphery segments 4a, 5a of the of the first end side 4 and second side end. In the particular illustrated embodiment, the reinforcement bar 4b, 5b is also removably attached to an extends over the associated corner segments 6a.

As already discusses earlier, the reinforcement bars 4b, 5b are of a different material than the periphery segments 2a -6a and the reinforcement bars 4b, 5b have an elastic modulus higher than that of the periphery segments 2a-6a. For example, the reinforcement bars 4b, 5b may be made from steel or a composite material, whereas the periphery segments 2a -6a may be made from a plastics material.

Figure 3:
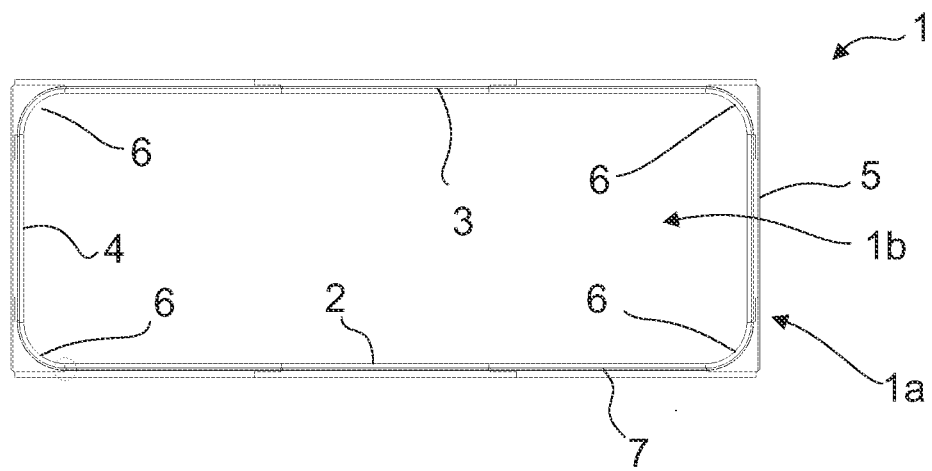
FIG. 3 illustrates the filter plate subframe of FIG. 1 as seen as a plan view.
Figure 4:
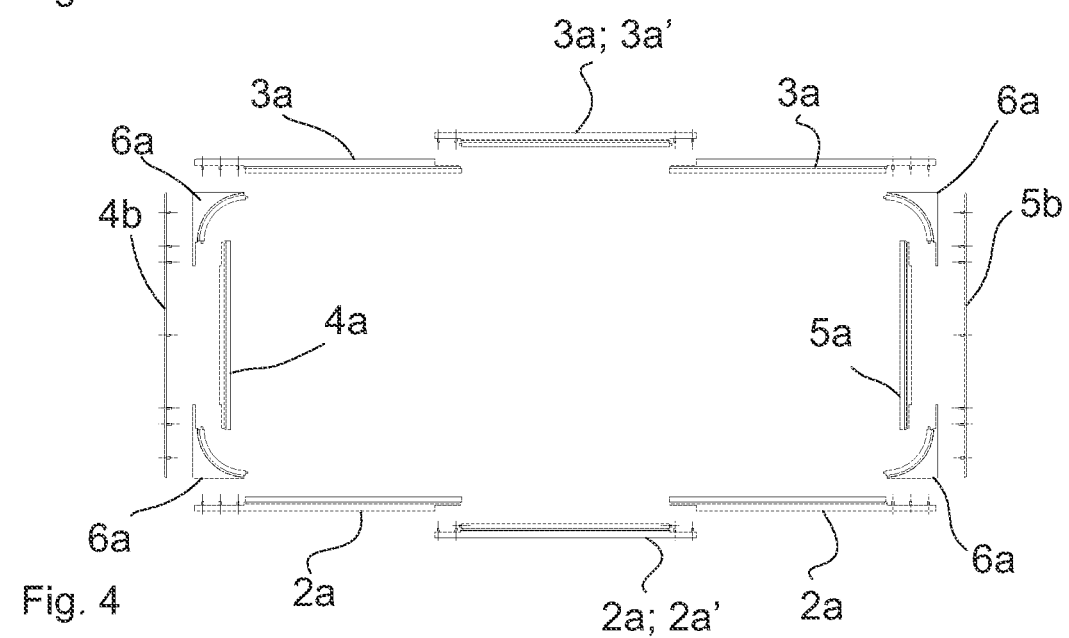
FIG. 4 illustrates the filter plate subframe of FIG. 1 as seen as an exploded plan view.

FIG. 3 shows a plan view of the subframe 1 of FIG. 1, as seen from the second planar side 1d of the periphery region. FIG. 4, in turn, illustrates an exploded configuration similar to that of FIG. 2, as seen as a plan view from the second planar side 1d of the periphery region.

Figure 5:
FIG. 5 illustrates a detailed view of an encircled section of FIG. 3.

FIG. 5 shows a detailed view of the encircled section shown in FIG. 3 between the lower left corner 6 and the first flank side 2. Particularly, a diaphragm groove 7 for receiving a corresponding bead of a filter diaphragm so as to attach such diaphragm to the filter subframe 1. As can be seen from FIGS. 1-5, the diaphragm groove 7 is provided on the second planar side 1d and runs along the periphery region 1b. Particularly, the groove 7 is formed on separate periphery segments 2a -6a attached to each other so as to form the continuous annular groove 7.

Moreover, FIG. 5 shows a seal 8 being provided in a joint between adjacent periphery segments 2a and 6a.

Figure 6:
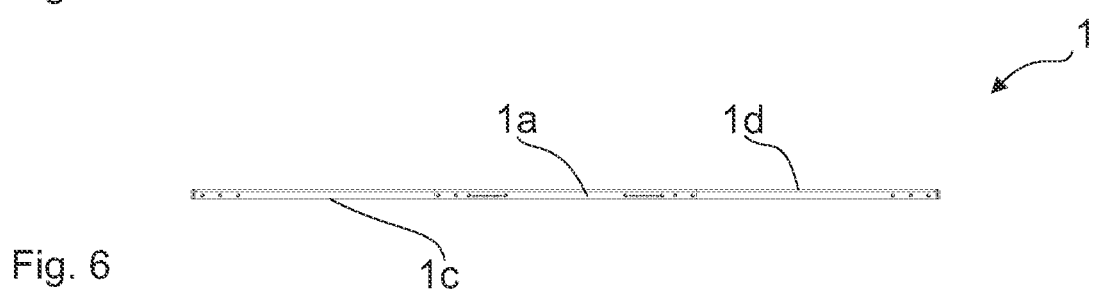
FIG. 6 illustrates the filter plate subframe of FIG. 1 as seen as a side view.

FIG. 6, in turn, illustrates the filter plate subframe 1 as seen form a side view. Particularly, the first planar side 1c and a second planar side 1d of the periphery region la are shown.

LIST OF REFERENCE NUMERALS 1 filter plate subframe
1a periphery region
1b open region
1c first planar side
1d second planar side
2 first flank side
2a periphery segment
2a' feed segment
3 second flank side
3a periphery segment
3a' feed segment
4 first end side
4a periphery segment
4b reinforcement bar
5 second end side
5a periphery segment
5b reinforcement bar
6 corner
6a corner periphery segment
7 diaphragm groove
8 segment seal

The invention claimed is:

1. A filter plate subframe for a filter plate frame assembly having a filter plate frame and a filter plate subframe receivable therein,
   wherein the subframe comprises separate periphery segments attached to each other so as to form a continuous periphery region of the subframe, such that the periphery region surrounds and delimits an open region of the subframe,
   wherein the periphery region is of a generally rectangular shape having:
   a first flank side and an opposite second flank side parallel with the first flank side, the flank sides running along a longitudinal direction of the subframe, and
   a first end side and an opposite second end side parallel with the first end side, the end sides being transverse to the flank sides,
   wherein the flank sides have a linear density lower than that of the end sides, and the end sides have a bending stiffness higher than that of the flank sides, wherein either or both of the first end side and the second end side are provided with a reinforcement bar for increasing the bending stiffness said end sides, wherein the subframe is configured to be slidably receivable within a filter plate frame along the longitudinal direction of the subframe, and wherein a supporting surface is provided on a first planar side of periphery segments forming the flank sides the supporting surface being configured to support the filter plate subframe on a corresponding receiving surface of an associated filter plate frame.

2. The filter plate subframe according to claim 1, wherein the supporting surfaces are arranged to have a dry kinetic friction coefficient with steel of no more than 0.3, as defined in accordance with ASTM D1894.

3. The filter plate subframe according to claim 1, wherein the reinforcement bar extends up to, or over, corners between an end side and flank sides adjacent to the end side associated to the reinforcement bar.

4. The filter plate subframe according to claim 1, wherein the reinforcement bar is of a different material than the periphery segments, the material of the reinforcement bar having an elastic modulus higher than that of the periphery segments.

5. The filter plate subframe according to claim 4, wherein the reinforcement bar is made from steel or a composite material, and wherein the periphery segments are made from a plastics material.

6. The filter plate subframe according to claim 1, wherein each corner between adjacent end sides and flank sides is provided with an identical corner periphery segment.

7. The filter plate subframe according to claim 1, wherein at least one of the periphery segments is a feed segment comprising one or more feed openings for feeding slurry to be filtered into the open region, when in use, and wherein the feed segment is removably attached to adjacent periphery segments.

8. The filter plate subframe according to claim 7, wherein the feed segment is removable from adjacent periphery segments in a direction away from the open region.

9. The filter plate subframe according to claim 7, wherein the feed segment is provided at either or both of the first flank side and the second flank side.

10. The filter plate subframe according to claim 7, wherein identical feed segments are provided at both the first flank side and the second flank side.

11. The filter plate subframe according to claim 1, wherein a diaphragm groove being provided on a second planar side of the periphery region, opposite to the first planar side, for receiving and attaching with a corresponding bead of a filter diaphragm, wherein the diaphragm groove runs along the periphery region and is formed on separate periphery segments attached to each other so as to form a continuous annular groove.

12. The filter plate subframe according to claim 1, wherein a sealing strip groove being provided on the first planar side of the periphery region, for receiving and attaching with a corresponding sealing strip of a filter plate, wherein the sealing strip groove runs along the periphery region and is formed on separate periphery segments attached to each other so as to form a continuous annular groove.

13. The filter plate subframe according to claim 1, wherein a segment seal is provided in a joint between adjacent periphery segments.

14. The filter plate subframe according to claim 11, wherein the segment seal is provided at a portion of the joint coinciding with the diaphragm groove and the sealing strip groove, the segment seal being provided as a cylindrical peg extending between a bottom of the diaphragm.

* * * * *